J. M. GANTVOORT.
BAKER'S OVEN.
APPLICATION FILED FEB. 9, 1921.
1,410,466.
Patented Mar. 21, 1922.
3 SHEETS—SHEET 1.
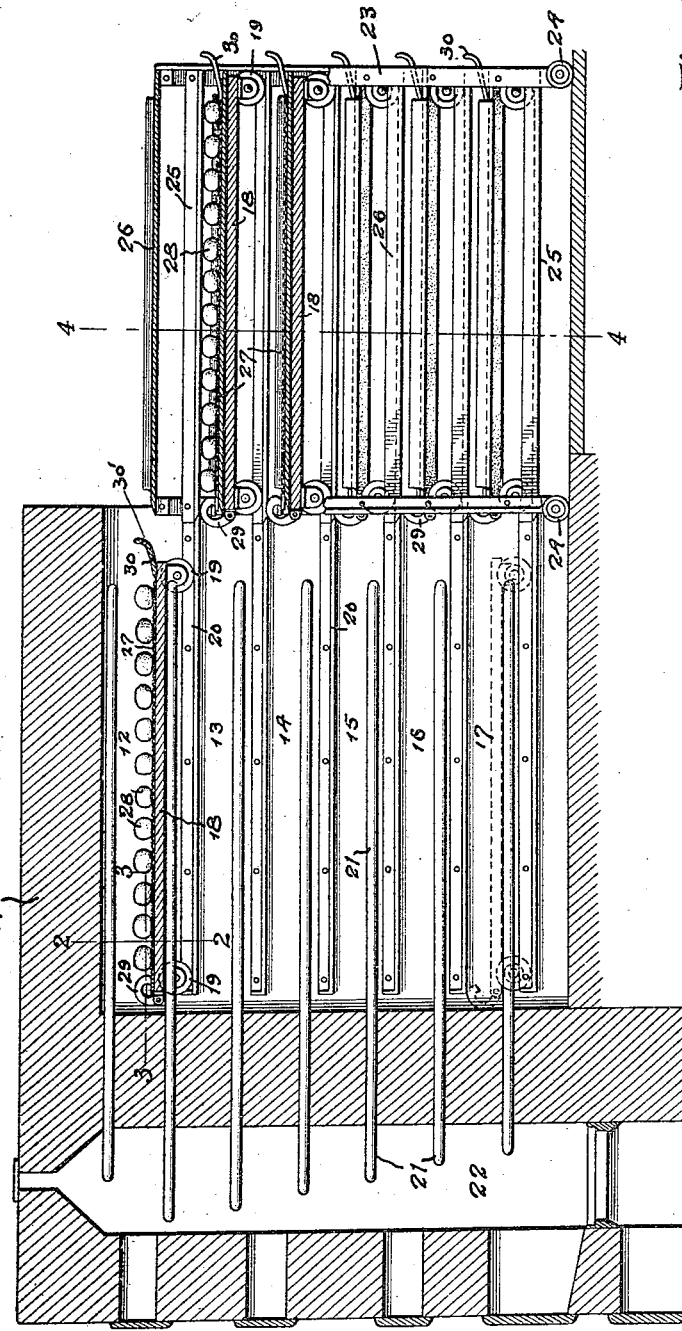
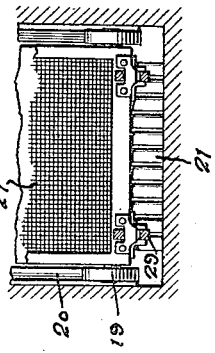
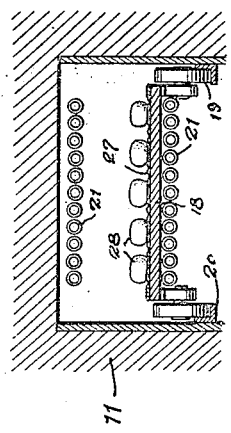
INVENTOR
John M. Gantvoort
BY
*Stowson and Stowson*
ATTORNEYS J. M. GANTVOORT.
BAKER'S OVEN.
APPLICATION FILED FEB. 9, 1921.
1,410,466.
Patented Mar. 21, 1922.
3 SHEETS—SHEET 2.
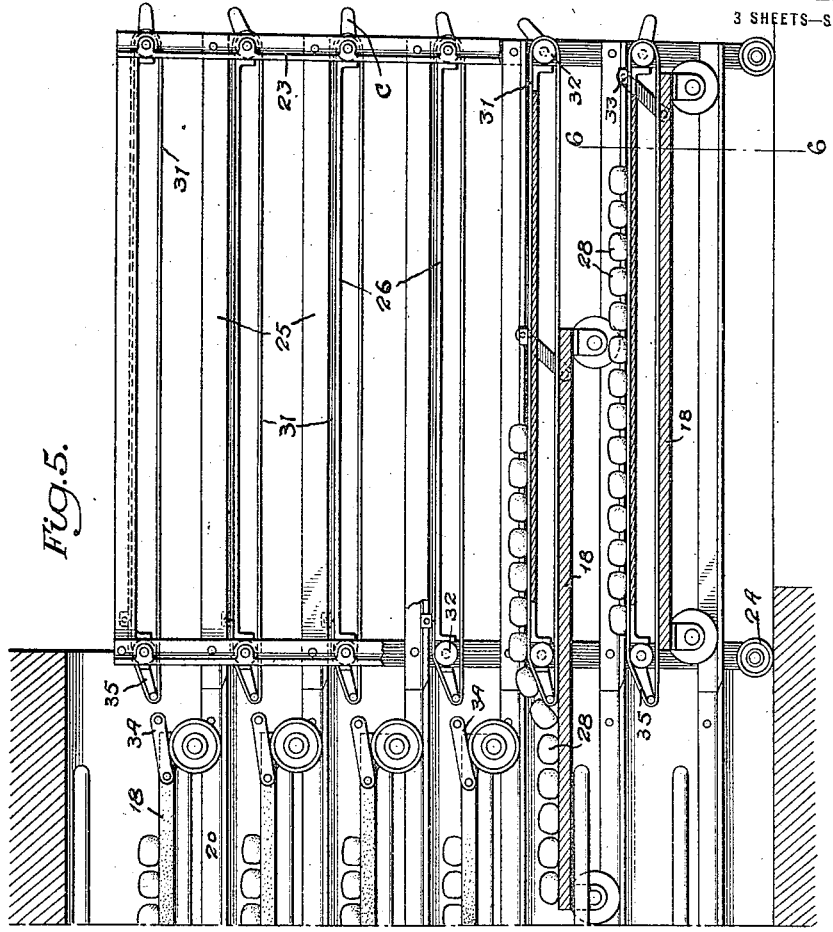
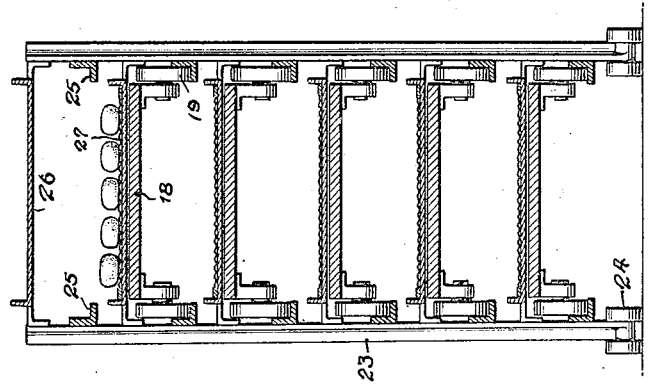
INVENTOR
JOHN M. GANTVOORT
BY
ATTORNEYS J. M. GANTVOORT.
BAKER'S OVEN.
APPLICATION FILED FEB. 9, 1921.
1,410,466.
Patented Mar. 21, 1922.
3 SHEETS—SHEET 3.
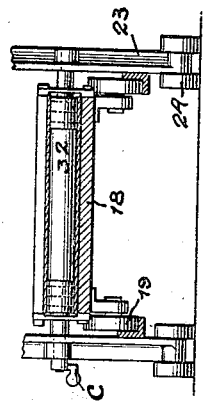
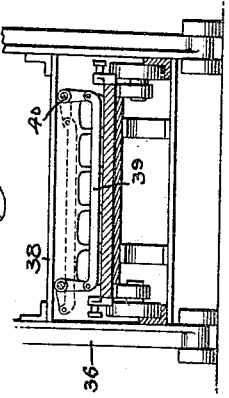
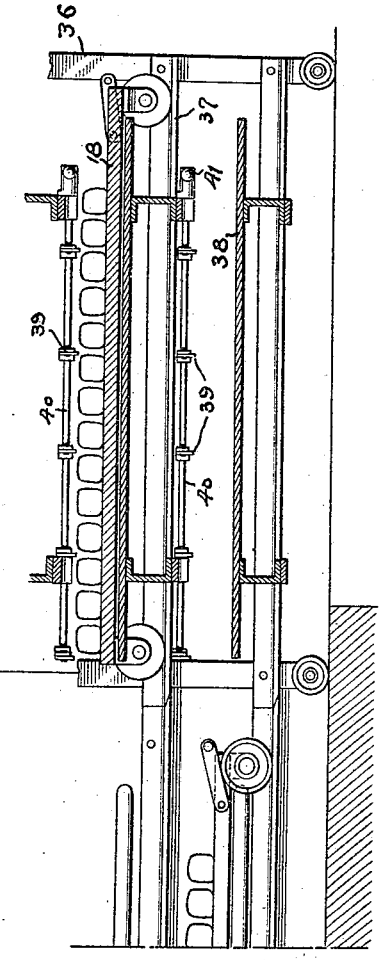
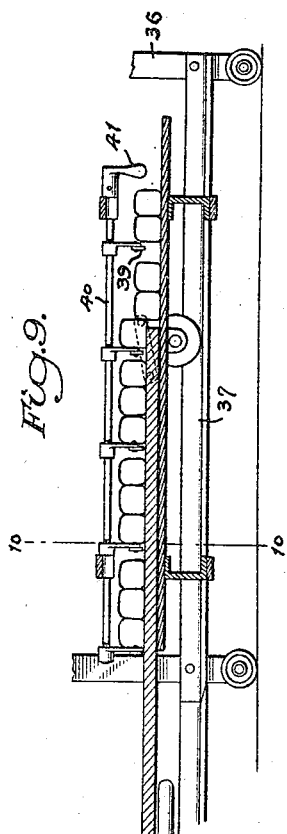
INVENTOR
JOHN M. GANTVOORT
BY
ATTORNEYS

UNITED STATES PATENT OFFICE.

JOHN M. GANTVOORT, OF BEACON, NEW YORK.

BAKER'S OVEN.

1,410,466.   Specification of Letters Patent.   Patented Mar. 21, 1922.

Application filed February 9, 1921. Serial No. 443,590.

*To all whom it may concern:*

Be it known that I, JOHN M. GANTVOORT, a citizen of the United States of America, residing at Beacon, in the county of Dutchess and State of New York, have invented certain new and useful Improvements in Bakers' Ovens, of which the following is a specification.

My invention relates to bakers' ovens, and particularly to an improved apparatus and method for loading and discharging the goods. The invention is particularly applicable to ovens for baking what is known as hearth bread, as distinguished from pan bread, and involves the use of racks having a general resemblance to those shown in my prior Patent No. 1,135,172, dated April 15, 1915, but differing markedly therefrom by the introduction of features of construction and operation adapted to the handling of hearth goods on the racks as well as in the oven.

In the accompanying drawings—

Fig. 1 is a longitudinal section through an oven and associated rack embodying my invention in one form;

Figs. 2, 3 and 4 are, respectively, sections on lines 2—2, 3—3 and 4—4, Fig. 1;

Fig. 5 is a similar view illustrating the invention embodied in a modified construction;

Fig. 6 is a section on the line 6—6, Fig. 5;

Fig. 7 is a section of a detail;

Fig. 8 is a partial section corresponding to Fig. 5, illustrating a hearth discharging apparatus;

Fig. 9 is a similar view showing the operation of the apparatus; and

Fig. 10 is a section on the line 10—10, Fig. 9.

In my prior patent above referred to, I disclose a baker's installation and method of operation in which the shelf, on which the baking proceeds, receives the panned goods before they enter the proofing room, and the rack which carries a group of rack shelves is bodily moved into the proofing room and remains there during the proofing operation. Thereafter it is transported to position in front of the oven and the shelves transferred from the rack to the oven without disturbing the panned goods. This practice is exceedingly valuable for baking pan bread, since it obviates the trouble and delays incident to the handling of the panned goods after they leave the proofing room. Hearth bread, however, requires a hot hearth at the beginning of the baking operation, and it is consequently not practicable to withdraw a shelf suitable for hearth baking from the oven, since its passage through the proofing chamber would so cool it as to deleteriously effect the baking operation upon the introduction of the shelf into the oven. Moreover a hot hearth is not suitable to receive dough for the proofing step in the preparation for the oven.

The present invention provides a novel method of handling hearth baked goods to expedite the transfer of the proofed goods from the proofing rack to the hearth, and it is particularly adapted to a multiple baking chamber oven of the general type indicated in my patent above referred to.

As shown in Fig. 1, the oven 11 (more or less diagrammatically illustrated) comprises a series of superposed baking chambers 12, 13, 14, 15, 16 and 17 formed by the several movable hearths 18, which are slidably supported in the oven. The method of support is not material, but for convenience I have shown each hearth mounted on rollers 19, which run on angle bar tracks 20 fixed in the opposite sides of the oven chamber. Perkins tubes 21 project into the oven from the fire box 22 and serve to heat the hearths 18 and the several baking chambers formed thereby. For simplicity of illustration I have omitted the front frame and doors to the oven chambers, which may in a general way resemble those of my prior patent, or of the commercial oven now generally known to the trade under the trade-mark "Rack oven."

Associated with the oven is a loading and unloading rack 23, supported on rollers 24 so that it may be freely moved from the position in which the goods to be baked are loaded thereon to the proofing room (not shown), and thence to a position in front of the oven. The rack is provided on opposite sides with angle-iron tracks 25 adapted to register with the ends of the tracks 20 in the oven, when the rack is in position for loading or unloading the oven. Spaced above the tracks 25 a distance sufficient to accommodate the empty sliding hearth 18 is a supporting plate or shelf 26 of any suitable construction, upon which freely rest light reticulated screens 27. The shaped dough 28 is placed upon these screens 27 either before or after the latter are positioned on the shelves 26, and the loaded rack moved into the proofing room, where it remains during proofing of the dough. When the proofing is completed, the rack is transferred bodily to a position in front of the oven, as illustrated in Fig. 1. The movable hearths 18 are now, one at a time, run out on the tracks 25 of the rack to a position beneath the shelves 26. Each hearth carries at its inner end an appropriate catch of any sort, such for example as a pivoted latch 29, which may be swung up into latching engagement with the inner end of the screen 27. When the latch has been thus engaged with the screen—an operation consuming but a moment's time,—the hearth is returned to the oven, dragging with it the screen from the superposed shelf 26. The screen is thus deposited with its proofed dough upon the hearth during its return to the hot oven chamber. Practically none of the oven heat imparted to the hearth is lost during this brief operation. I have shown a series of six hearths 18 in Fig. 1, and the operation of withdrawing the several hearths, latching them in engagement with the screens, and returning them to the oven, one after the other, occupies less than a minute, under normal operating conditions.

After baking is completed, the hearths are again drawn out, one at a time, on the rack. During the draw-out operation the screen is automatically lifted from the hearth by the shoe 30, which engages the forward edge of the shelf 26 and rides up on the latter, thus leaving the baked goods in the same position of support on the rack as that which they occupied before their introduction into the oven. To facilitate the withdrawal of the hearth with the baked goods in position thereon, I may provide the shoe 30 with any suitable means for engaging it, such as a hole 30' adapted to receive a hook at the end of a pull rod. The latch 29 being now freed, the hearth is at once returned to position in the oven. After the hearths have been all thus unloaded, the rack carrying the baked goods is transported to the cooling room, where the screens are discharged and returned with the rack for reuse.

Alternatively, the latches 29 may be freed in any suitable manner while the hearth remains in the oven, e. g., by shoving the screen, or an associated latch opening bar, inward slightly, thus tilting the latch to open position and permitting the screen, with the baked goods thereon, to be drawn out on the shelves 26 without disturbing the oven hearths.

In the construction just described, the thin screen 27, while interfering only slightly with the proper baking operation, by reason of its light weight and reticulated character, is nevertheless objectionable to some bakers by reason of the fact that it leaves on the bottom of the loaf a grid-like marking, which is not found in ordinary hearth bread. To obviate this possible objection, I have provided a modified form of loading device shown in Figs. 5 and 6. In this construction I have substituted for the reticulated screen a series of conveyor belts 31, each passing around rollers 32 on the rack, and provided at a suitable point, in its opposite margins, with a latching device 33. During the proofing operation, while the shaped dough rests upon the conveyor, the latching device 33 is located at a point adjacent the outer end of the rack. The hearths 18 are drawn out, one at a time, upon the rack in like manner as first described, and a cooperating latching element 34 at the outer end of the hearth 18 is engaged with the latches 33 on the belt. As the hearth is returned to the oven it pulls the upper reach of the conveyor belt forward, thus discharging the proofed dough thereon to the hearth 18 as it returns to the baking chamber. In order to prevent injurious disturbance to the proofed dough during this transfer, I provide an inclined apron 35, over which the belt passes at one end, and down which the dough moves to the hearth as illustrated in Fig. 5. Each roller 32 at the outer end of the rack may be provided with a crank C for returning the empty belt 31 to its original position.

This loading device is unsuitable for the reception of the baked bread from the hearth after the baking operation is completed. I therefore provide an independent unloading rack 36 which carries rails 37 to receive the drawn-out hearths, and also shelves 38 which underlie the hearths in their drawn-out position. To unload the baked goods from a hearth, each compartment of the rack has one or more scrapers 39, preferably in the form of a cross blade, supported by links from longitudinally extending shafts 40, one of which has a handle 41 at the outer end of the rack by which the blade or blades may be swung up out of obstructing position during the withdrawal of the hearth from the oven to the rack, after which the handle may be turned to swing the blade or blades 39 down into position to engage the baked loaves. When the hearth is returned to the oven, the knives 39 scrape the baked bread from the hearth and deposit it upon the subjacent shelves 38. While this practice requires an additional rack for unloading, the additional expense to the installation is not great, since the unloading operation is very rapid, and a single unloading rack may serve a number of ovens without difficulty.

In both of the constructions illustrated, the advantage of maintaining the hearths 18 constantly at baking temperature is secured. The momentary withdrawal of the hearths seriatim from the oven for the loading and unloading operations is too brief to lose any material portion of their proper baking temperature. The installation as a whole retains practically all of the advantages of ease and facility in handling the goods, and expedition of the operations intermediate proofing and baking which are attained by the construction shown in my prior patent adapted to the handling of pan goods, but now secured in the entirely different class of goods which requires hearth baking.

In the following claims I use the word "ceramic" in a sense broad enough to cover slate, soapstone, cement, tile, porcelain, or other hearth material suitable for baking what is commonly known as hearth bread.

I claim as my invention—

1. A baker's installation comprising an oven having superposed ceramic oven hearths movably supported therein to permit of withdrawal, in combination with a freely movable rack having a series of superposed supports for the withdrawn hearths, and means for depositing goods to be baked upon said hearths during their return to the baking chamber.

2. A baker's installation comprising an oven having superposed hearths movably supported therein to permit of withdrawal, in combination with a freely movable rack having a series of superposed supports for the withdrawn hearths, movable supports on said rack for the goods to be baked, and means for transferring the goods to the hearths during their return to the baking chamber.

3. In a baker's installation, a freely movable rack adapted to be positioned before a multi-chambered oven for the transfer of goods thereto, a series of vertically spaced flexible carriers for the goods, and subjacent fixed rigid supports for the carriers.

4. In a baker's installation, a freely movable rack adapted to be positioned before an oven for the transfer of goods thereto, a series of vertically spaced carriers for the goods, and a series of supports subjacent each carrier for supporting a hearth withdrawn from the oven.

5. In a baker's installation, a freely movable rack adapted to be positioned before an oven for the transfer of goods thereto, a series of vertically spaced carriers for the goods, and a series of supports subjacent each carrier for supporting a hearth withdrawn from the oven, together with means for each carrier adapted to be engaged by a hearth element to displace the goods carrier during the return of the hearth to the oven for the purpose described.

6. In a baker's installation, a freely movable rack adapted to be positioned before a multi-chambered oven for the transfer of goods between the rack and oven, a series of vertically spaced supports on the rack for the hearths withdrawn from the oven, and vertically spaced rigid shelves on the rack for supporting the goods.

7. The method of handling hearth baked goods, which consists in proofing the shaped dough in a series of superposed spaced oven charges, moving said charges in said relation to a position in front of an oven having a corresponding series of superposed spaced movable baking hearths, and, in series, withdrawing each of said hearths from the oven to a position below a corresponding charge of proofed dough, and automatically depositing said charge on the hearth during the return of the hearth to the oven.

8. The method of handling hearth baked goods, which consists in baking the shaped and proofed dough on superposed movable baking hearths in an oven, and after baking is completed, serially withdrawing the hearths from the oven and depositing the baked goods therefrom upon superposed vertically spaced supports each adapted to receive the charge of a baking hearth.

In testimony whereof I have signed my name to this specification.

JOHN M. GANTVOORT.